3,128,758
Patented Apr. 14, 1964

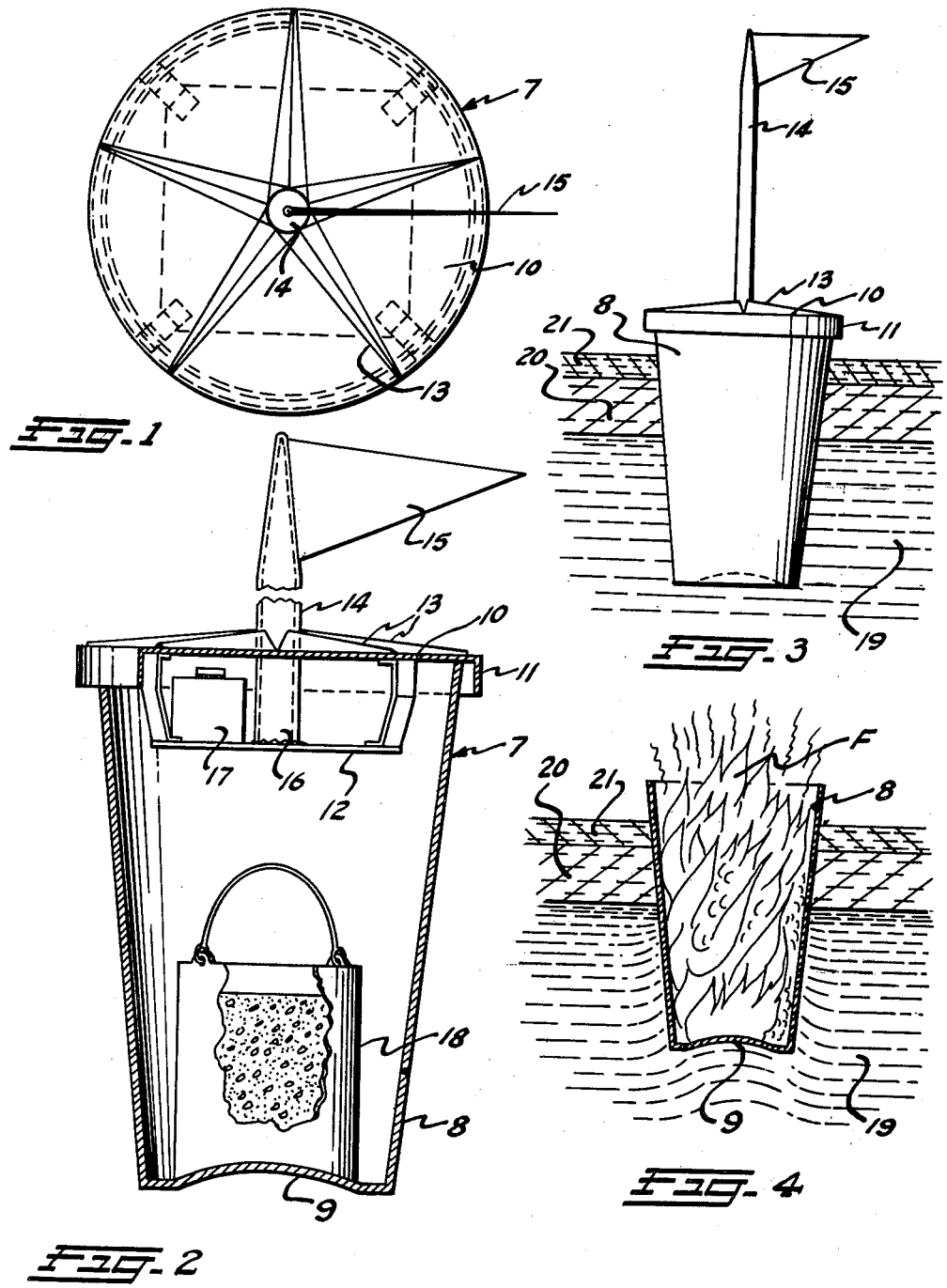

3,128,758
ICE HOLE MAKER
Harold C. Schwabe, Rte. 1, Box 187, Grafton, Wis.
Filed Apr. 2, 1962, Ser. No. 184,184
3 Claims. (Cl. 126—360)

This invention relates to a device used in fighting fires in areas where natural sources of water such as creeks, rivers, ponds and lakes are frozen over in the wintertime thus making it difficult and time consuming if not impossible to obtain water with which to put out the fire.

Rural homes in remote areas are more often than not totally destroyed or seriously damaged by fire in the wintertime because of lack of ability to get at a much needed water supply because of its being frozen over even though modern fire fighting equipment has arrived in ample time to put out the fire once water is obtainable.

It is, therefore, an object of this invention to provide an ice hole maker in the form of a device that can be placed in any nearby water supply in the fall before the water freezes and thus insure the occupants of all buildings within a reasonable distance of a supply of water on short notice for the fighting of any fire that may occur during the winter.

Another object of this invention is to provide an ice hole maker that does not require any maintenance whatsoever.

Another object of this invention is to provide an ice hole maker that does not have any mechanism to get out of order or require time consuming adjusting.

Another object of this invention is to provide an ice hole maker that can be manufactured in large quantities and retailed at a price well within the reach of all who have need or desire this kind of a device.

Another object of this invention is to provide an ice hole maker that can be used by even the most uneducated of people regardless of their age or sex.

Another object of this invention is to provide an ice hole maker that will not deteriorate even though it is left out in the ice all winter long.

Another object of this invention is to provide an ice hole maker that can readily be manufactured to make any diameter of hole in any thickness of ice in a minimum of time.

Another object of this invention is to provide an ice hole maker that can also be used for making a hole in ice through which one can fish in the wintertime when the water is normally frozen over.

Still another object of this invention is to provide an ice hole maker that is made of light weight material thus making it easy for one to carry and otherwise handle this device.

Other and further objects and advantages of this ice hole maker will be hereinafter described, and the novel features thereof defined in the appended claims.

Referring to the drawing:

FIGURE 1 is a top view of this invention ready to place in the water;

FIGURE 2 is a sectional view of this invention taken substantially along line 2—2 of FIGURE 1 as viewed in the direction indicated by the arrows;

FIGURE 3 is a side view of this invention showing it in a body of water frozen over;

FIGURE 4 is a vertical sectional view of this invention in a body of water frozen over and in the process of making a hole in the ice. Both the top and ballast have been removed.

Similar reference characters refer to similar parts throughout the several views of the drawing.

Having reference now to the drawing in detail, there is generally indicated by the character 7 an ice hole maker embodying a bucket 8 having the shape of a frustum of a cone the small end of which is the bottom 9 which is concaved as clearly shown in FIGURE 2 of the appended drawing. The bucket 8 is provided with a removable cover 10 having a downwardly turned periphery 11 and a rack 12 suspended from the underside and center of the aforesaid cover.

The cover 10 is provided with a plurality of ribs 13 forming a star in plan form in the present embodiment. The ribs giving added rigidity to the said cover, a tapered staff 14 having a triangular shaped pennant 15 secured to the top thereof is located in the center of the aforesaid cover 10. The bottom 16 of the staff 14 projecting downward through the top to rest on the upper surface of the rack 12 on which is placed the fuel 17.

The basic construction of this novel invention has now been described. The way in which it is used is as follows: The bucket 8 is placed in any desired body of water before it freezes over and ballast 18 is placed in the bottom of the same in order to allow the aforesaid bucket to float at a predetermined depth in the water. The ballast 18 may be locally obtained said or rock or it may be a concrete block or simply concrete hardened in a can having a handle such as illustrated in FIGURE 2 of the appended drawing. The cover 10 with fuel 17 preferably some inflammable liquid such as alcohol, kerosene or the like in a suitable container is now placed on the rack 12 of the cover 10 which is then placed on the top of the aforesaid bucket 8. When the water 19 freezes and ice 20 is formed and to some extent melts, and the new ice 21 forms on top of the old ice 20 the ice hole maker 7 with its pennant 15 will be solidly frozen in the aforesaid ice where it will remain until removed. The pennant 15, of course, providing excellent means of instantly locating the same.

In the event of a fire or any need to obtain a hole in the ice one only has to grasp the tapered staff 14 and thus remove the cover 10 to which it is attached. The ballast 18 is now removed and the fuel 17 which as stated before, is preferably some inflammable liquid such as alcohol is poured into the bottom of the bucket 8 where it is lit with a match. The resultant fire will naturally generate heat which will be conducted through the walls of the aforesaid bucket 8 and thus melt the ice which is holding the same. Because of the taper of the walls of the bucket and the upward push of the water 19 from the bottom, the bucket 8 will float out of the ice thus leaving a clean ice chip free opening in a very short time. The aforesaid bucket 8 with the fire herein characterized the first time by the capital "F" is clearly shown in FIGURE 4 of the appended drawing.

From the foregoing it will now be seen that there is herein provided an ice hole maker which accomplishes all of the objects of this invention, and others, including many advantages of great practical utility and commercial importance.

As many embodiments may be made of this inventive concept, and as many modifications may be made in the embodiment hereinbefore shown and described, it will be understood that all matter herein is to be interpreted merely as illustrative, and not in a limiting sense.

In accordance with the provisions of the United States patent statutes, as stated in the United States Code Title 35, Patents, I have now described the principle of construction and operation of my invention of ice hole maker in the form which I personally consider the best embodiment thereof, and what I now claim as my invention and desire to secure by Letters Patent is:

1. An ice hole maker of the character described, comprising a metal bucket of non-corrodible metal having a removable cover to the underside of which is attached a rack, a staff having a pennant protruding upward from the said cover to which it is secured, and a container of liquid fuel placed on the said rack and removable ballast placed in the said bucket which is adapted to be placed in a natural body of water before the same freezes over forming ice, the said bucket, with the ballast and fuel adapted to float at a predetermined depth in the said water, when it is desirable to make a hole in the said ice the said cover can be removed from the said bucket, the ballast can be removed and the fuel can be poured into the bucket and ignited thereby generating heat which acting on the sides of the said bucket melts the ice holding the same within its grip thereby providing a clean ice-chip free opening in the said ice when the said bucket is removed from the said water.

2. An ice hole maker of the character described, comprising a metal bucket of non-corrodible metal having the shape of a frustum of a cone and a concaved bottom, a removable cover having a downwardly turned periphery, a rack attached to the underside of the said cover, a staff having a pennant protruding upward from the said cover to which it is secured, a container filled with liquid fuel placed on the said rack and a removable container of ballast placed in the said bucket, which is adapted to be placed in a natural body of water before the same freezes over forming ice, the said bucket, with the ballast and fuel adapted to float at a predetermined depth in the said water, when it is desirable to make a hole in the said ice the said cover can be removed from the said bucket, the ballast can be removed and the fuel can be poured into the bucket and ignited thereby generating heat which acting on the sides of the said bucket melts the ice holding the same within its grip thereby providing a clean ice-chip free opening in the said ice when the said bucket is removed from the said water.

3. An ice hole maker of the character described, comprising a metal bucket of non-corrodible metal having the shape of a frustum of a cone and a concaved bottom, a removable cover having a downwardly turned periphery, a staff having a pennant protruding upward from the said cover to which it is secured, and a container of liquid fuel placed on the said rack and a container of ballast having a handle placed in the said bucket which is adapted to be placed in a natural body of water before the same freezes over forming ice, the said bucket, with the ballast and fuel adapted to float at a predetermined depth in the said water, when it is desirable to make a hole in the said ice the said cover can be removed from the said bucket and the ballast can be removed and the fuel can be poured into the bucket and ignited thereby generating heat which acting on the sides of the said bucket melts the ice holding the same within its grip thereby providing a clean ice-chip free opening in the said ice when the said bucket is removed from the said water.

References Cited in the file of this patent

UNITED STATES PATENTS

| | | |
|---|---|---|
| 188,869 | Devoe | Mar. 27, 1877 |
| 391,297 | Cascaden | Oct. 16, 1888 |
| 499,403 | Sugg | June 13, 1893 |
| 1,259,059 | Waterbury | Mar. 12, 1918 |
| 2,787,397 | Radford | Apr. 2, 1957 |
| 3,025,852 | Quilling | Mar. 20, 1962 |